United States Patent
Han et al.

(10) Patent No.: US 8,520,962 B2
(45) Date of Patent: Aug. 27, 2013

(54) METHOD AND APPARATUS FOR EFFECTIVELY COMPRESSING MOTION VECTORS IN VIDEO CODER BASED ON MULTI-LAYER

(75) Inventors: Woo-jin Han, Suwon-si (KR); Kyo-hyuk Lee, Seoul (KR); Jae-young Lee, Suwon-si (KR); Sang-chang Cha, Hwaseong-si (KR); Bae-keun Lee, Bucheon-si (KR); Ho-jin Ha, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/355,619

(22) Filed: Jan. 23, 2012

(65) Prior Publication Data

US 2012/0189061 A1 Jul. 26, 2012

Related U.S. Application Data

(63) Continuation of application No. 13/005,990, filed on Jan. 13, 2011, now Pat. No. 8,116,578, which is a continuation of application No. 11/254,051, filed on Oct. 20, 2005, now Pat. No. 7,889,793.

(60) Provisional application No. 60/620,328, filed on Oct. 21, 2004.

(30) Foreign Application Priority Data

Dec. 8, 2004 (KR) .................. 10-2004-0103059

(51) Int. Cl.
*G06K 9/36* (2006.01)
*G06K 9/46* (2006.01)
(52) U.S. Cl.
USPC ............... 382/238; 375/240.11; 375/240.21; 382/236

(58) Field of Classification Search
USPC .............. 375/240.01, 240.1, 240.11, 240.21; 382/236, 238
See application file for complete search history.

(56) References Cited

U.S. PATENT DOCUMENTS 5,418,571 A 5/1995 Ghanbari
6,339,618 B1 1/2002 Puri et al.
(Continued)

FOREIGN PATENT DOCUMENTS

| EP | 1021039 A2 | 7/2000 |
| WO | 2004056121 A1 | 7/2004 |
| WO | 2004073312 A1 | 8/2004 |

OTHER PUBLICATIONS

United States Patent and Trademark Office, "Non-Final Office Action," issued in connection with U.S. Appl. No. 11/254,051, on May 14, 2010.

(Continued)

*Primary Examiner* — Gregory M Desire
(74) *Attorney, Agent, or Firm* — Sughrue Mion, PLLC

(57) ABSTRACT

A method and apparatus of improving the compression efficiency of a motion vector is provided. The method includes obtaining a motion vector in a base layer frame having a first frame rate from an input frame, obtaining a motion vector in a first enhancement layer frame having a second frame rate from the input frame, the second frame rate being greater than the first frame rate, generating a predicted motion vector by referring to a motion vector for at least one frame among base layer frames present immediately before and after the same temporal position as the first enhancement layer frame if there is no base layer frame at the same temporal position as the first enhancement layer frame, and coding a difference between the motion vector in the first enhancement layer frame and the generated predicted motion vector, and the obtained motion vector in the base layer.

5 Claims, 10 Drawing Sheets

(56) References Cited

U.S. PATENT DOCUMENTS

| | | | |
|---|---|---|---|
| 6,427,027 | B1 | 7/2002 | Suzuki et al. |
| 6,510,177 | B1 | 1/2003 | De Bonet et al. |
| 6,873,655 | B2 | 3/2005 | Comer et al. |
| 6,907,070 | B2 | 6/2005 | Wu et al. |
| 6,940,905 | B2 | 9/2005 | Van Der Schaar et al. |
| 6,996,173 | B2 * | 2/2006 | Wu et al. .................. 375/240.1 |
| 7,062,096 | B2 | 6/2006 | Lin et al. |
| 7,072,394 | B2 | 7/2006 | Huang et al. |
| 7,146,056 | B2 | 12/2006 | Klein Gunnewiek et al. |
| 7,860,161 | B2 * | 12/2010 | Xu et al. .................. 375/240.11 |
| 7,889,793 | B2 | 2/2011 | Han et al. |
| 2002/0009141 | A1 | 1/2002 | Yamaguchi et al. |
| 2002/0090028 | A1 * | 7/2002 | Comer et al. ............. 375/240.2 |
| 2002/0118743 | A1 * | 8/2002 | Jiang ...................... 375/240.01 |
| 2002/0159518 | A1 | 10/2002 | Bottreau et al. |
| 2004/0017852 | A1 | 1/2004 | Garrido et al. |
| 2004/0022318 | A1 | 2/2004 | Garrido et al. |
| 2004/0131121 | A1 | 7/2004 | Dumitras et al. |
| 2005/0002458 | A1 * | 1/2005 | Bruls et al. ............... 375/240.21 |
| 2005/0195896 | A1 | 9/2005 | Huang et al. |
| 2005/0201468 | A1 | 9/2005 | Tsai et al. |
| 2005/0226334 | A1 | 10/2005 | Han |
| 2006/0012719 | A1 | 1/2006 | Karczewicz et al. |
| 2006/0088101 | A1 | 4/2006 | Han et al. |
| 2007/0147492 | A1 | 6/2007 | Marquant et al. |

OTHER PUBLICATIONS

United States Patent and Trademark Office, "Notice of Allowance," issued in connection with U.S. Appl. No. 11/254,051, on Oct. 7, 2010.

United States Patent and Trademark Office, "Non-Final Office Action," issued in connection with U.S. Appl. No. 13/005,990, on May 31, 2011.

United States Patent and Trademark Office, "Notice of Allowance," issued in connection with U.S. Appl. No. 13/005,990 on Oct. 11, 2011.

Campisi et al., "Three Dimensional Wavelet Based Approach for a Scalable Video Conference System," pp. 802-806, vol. 3, Proceedings of the 1999 International Conference, Oct. 24-28, 1999, Kobe.

He et al., "Improved Fine Granular Scalable Coding with Interlayer Prediction," pp. 172-181, Proceedings of the Data Compression Conference, Apr. 2-4, 2002.

Wu et al., "A Framework for Efficient Progressive Fine Granularity Scalable Video Coding," pp. 332-344, vol. 11, No. 3, IEEE Transactions on Circuits and Systems for Video Technology, Mar. 2001.

* cited by examiner

FIG. 10

MOTION BLOCK OF
BASE LAYER FRAME

| a | b | c | d |
|---|---|---|---|
| e | f | g | h |
| i | j | k | l |
| m | n | o | p |

MOTION BLOCK OF
ENHANCEMENT LAYER FRAME

| f8 | b7 | b8 | f7 | f8 | g7 |
|----|----|----|----|----|----|
| g6 | f5 | f6 | g5 | g6 | g5 |
| g8 | f7 | f8 | g7 | g8 | g7 |
| k6 | j5 | j6 | k5 | k6 | k5 |
| k8 | j7 | j8 | k7 | k8 | k7 |
| f6 | f5 | g6 | f5 | f6 | g5 |

US 8,520,962 B2

METHOD AND APPARATUS FOR EFFECTIVELY COMPRESSING MOTION VECTORS IN VIDEO CODER BASED ON MULTI-LAYER

CROSS-REFERENCE TO RELATED APPLICATIONS

The present application is a continuation of U.S. patent application Ser. No. 13/005,990, filed Jan. 13, 2011, allowed Oct. 11, 2011, which was a continuation of U.S. patent application Ser. No. 11/254,051, filed on Oct. 20, 2005, issued as U.S. Pat. No. 7,889,793 Feb. 15, 2011, which was a Non-Provisional Patent Application of U.S. Provisional Patent Application No. 60/620,328, filed on Oct. 21, 2004, and claims the benefit of Korean Patent Application No. 10-2004-0103059, filed on Dec. 8, 2004. The disclosures of the prior applications are hereby incorporated in their entireties by reference.

BACKGROUND OF THE INVENTION

1. Field of the Invention

The present invention relates to a video compression method, and more particularly, to a method and apparatus of improving the compression efficiency of a motion vector by efficiently predicting a motion vector in an enhancement layer from a motion vector in a base layer in a video coding method using a multi-layer structure.

2. Description of the Related Art

With the development of information communication technology, including the Internet, video communication as well as text and voice communication, has increased dramatically. Conventional text communication cannot satisfy users' various demands, and thus, multimedia services that can provide various types of information such as text, pictures, and music have increased. However, multimedia data requires storage media that have a large capacity and a wide bandwidth for transmission since the amount of multimedia data is usually large. Accordingly, a compression coding method is requisite for transmitting multimedia data including text, video, and audio.

A basic principle of data compression is removing data redundancy. Data can be compressed by removing spatial redundancy in which the same color or object is repeated in an image, temporal redundancy in which there is little change between adjacent frames in a moving image or the same sound is repeated in audio, or mental visual redundancy which takes into account human eyesight and its limited perception of high frequency. In general video coding, temporal redundancy is removed by motion compensation based on motion estimation and compensation, and spatial redundancy is removed by transform coding.

To transmit multimedia generated after removing data redundancy, transmission media are necessary. Transmission performance is different depending on transmission media. Currently used transmission media have various transmission rates. For example, an ultrahigh-speed communication network can transmit data of several tens of megabits per second while a mobile communication network has a transmission rate of 384 kilobits per second. Accordingly, to support transmission media having various speeds or to transmit multimedia at a data rate suitable to a transmission environment, data coding methods having scalability, such as wavelet video coding and subband video coding, may be suitable to a multimedia environment.

Scalability indicates the ability for a decoder part or a pre-decoder part to partially decode a single compressed bitstream according to conditions such as a bit rate, error rate, system resources or the like. A decoder or a pre-decoder decompresses only a portion of a bitstream coded by scalable coding and plays back the same to be restored into multimedia sequences having different video quality/resolution levels or frame rates.

FIG. 1 is a schematic diagram of a typical scalable video coding system. First, an encoder 50 codes an input video 51, thereby generating a bitstream 52. A pre-decoder 60 can extract different bitstreams 53 by variously cutting the bitstream 52 received from the encoder 50 according to an extraction condition, such as a bit rate, a resolution, or a frame rate, and as related with an environment of communication with a decoder 70 or mechanical performance of the decoder 70. Typically, the pre-decoder 60 is implemented to be included in a video stream server providing variable video streams to an end-user in variable network environments.

The decoder 70 reconstructs an output video 54 from the extracted bitstream 53. Extraction of a bit stream according to the extraction condition may be performed by the decoder 70 instead of the pre-decoder 60 or may be performed by both of the pre-decoder 60 and the decoder 70.

MPEG-4 (Motion Picture Experts Group 4) Part 13 standardization for scalable video coding is under way. In particular, much effort is being made to implement scalability based on a multi-layered structure. For example, a bitstream may consist of multiple layers, i.e., base layer and first and second enhancement layers with different resolutions (QCIF, CIF, and 2CIF) or frame rates.

Like when a video is encoded into a singe layer, when a video is encoded into multiple layers, a motion vector (MV) is obtained for each of the multiple layers to remove temporal redundancy. The motion vector MV may be separately searched for each layer (former approach) or a motion vector obtained by a motion vector search for one layer is used for another layer (without or after being upsampled/downsampled) (latter approach). The former approach has the advantage of obtaining accurate motion vectors while suffering from overhead due to motion vectors generated for each layer. Thus, it is a very challenging task to efficiently reduce redundancy between motion vectors for each layer.

FIG. 2 shows an example of a scalable video codec using a multi-layered structure. Referring to FIG. 2, a base layer has a quarter common intermediate format (QCIF) resolution and a frame rate of 15 Hz, a first enhancement layer has a common intermediate format (CIF) resolution and a frame rate of 30 Hz, and a second enhancement layer has a standard definition (SD) resolution and a frame rate of 60 Hz. For example, to obtain a stream of CIF and 0.5 Mbps, the enhancement layer bitstream of CIF_30Hz_0.7M may be truncated to meet the bit-rate of 0.5 M. In this way, it is possible to implement spatial, temporal, and SNR scalabilities. Because about twice as much overhead as that generated for a singe-layer bitstream occurs due to an increase in the number of motion vectors as shown in FIG. 2, motion prediction from the base layer is very important. Of course, since the motion vector is used only for an inter-frame coded by referring to neighboring frames, it is not used for an intra-frame coded without reference to adjacent frames.

As shown in FIG. 2, frames 10, 20, and 30 in the respective layers having the same temporal position can be estimated to have similar images thus similar motion vectors. Thus, one of the currently used methods for efficiently representing a motion vector includes predicting a motion vector for a current layer from a motion vector for a lower layer and coding a difference between the predicted value and the actual motion vector.

FIG. 3 is a diagram for explaining a conventional method for efficiently representing a motion vector using motion prediction. Referring to FIG. 3, a motion vector in a lower layer having the same temporal position as a current layer has conventionally been used as a predicted motion vector for a current layer motion vector.

An encoder obtains motion vectors $MV_0$, $MV_1$, and $MV_2$ for a base layer, a first enhancement layer, and a second enhancement layer at predetermined accuracies and performs temporal transformation using the motion vectors $MV_0$, $MV_1$, and $MV_2$ to remove temporal redundancies in the respective layers. However, the encoder sends the base layer motion vector $MV_0$, a first enhancement layer motion vector component $D_1$, and a second enhancement layer motion vector component $D_2$ to the pre-decoder (or video stream server). The pre-decoder may transmit only the base layer motion vector, the base layer motion vector and the first enhancement layer motion vector component $D_1$, or the base layer motion vector, the first enhancement layer motion vector component $D_1$ and the second enhancement layer motion vector component $D_2$ to a decoder to adapt to network situations.

The decoder then uses the received data to reconstruct a motion vector for an appropriate layer. For example, when the decoder receives the base layer motion vector and the first enhancement layer motion vector component $D_1$, the first enhancement layer motion vector component $D_1$ is added to the base layer motion vector $MV_0$ in order to reconstruct the first enhancement layer motion vector $MV_1$. The reconstructed motion vector $MV_1$ is used to reconstruct texture data for the first enhancement layer.

However, when the current layer has a different frame rate than the lower layer as shown in FIG. 2, a lower layer frame having the same temporal position as the current frame may not exist. For example, because a layer frame lower than a frame 40 is not present, motion prediction through a lower layer motion vector cannot be performed. That is, since a motion vector in the frame 40 cannot be predicted, a motion vector in the first enhancement layer is inefficiently represented as a redundant motion vector.

SUMMARY OF THE INVENTION

The present invention provides a method for efficiently predicting a motion vector in an enhancement layer from a motion vector in a base layer.

The present invention also provides a method for efficiently predicting a motion vector even if there is no lower layer frame at the same temporal position as a current layer frame.

According to an aspect of the present invention, there is provided a method for efficiently compressing multi-layered motion vectors, the method including (a) obtaining a motion vector in a base layer frame having a first frame rate from an input frame, (b) obtaining a motion vector in a first enhancement layer frame having a second frame rate from the input frame, the second frame rate being greater than the first frame rate, (c) generating a predicted motion vector by referring to a motion vector for at least one frame among base layer frames present immediately before and after the same temporal position as the first enhancement layer frame if there is no base layer frame at the same temporal position as the first enhancement layer frame, and (d) coding a difference between the motion vector in the first enhancement layer frame and the generated predicted motion vector, and the obtained motion vector in the base layer.

According to another aspect of the present invention, there is provided a method for efficiently encoding multi-layered motion vectors, the method including (a) obtaining a motion vector in a base layer frame having a first frame rate from an input frame, (b) obtaining a motion vector in a first enhancement layer frame having a second frame rate from the input frame, the second frame rate being greater than the first frame rate, (c) generating a predicted motion vector by referring to a motion vector for at least one frame among base layer frames present immediately before and after the same temporal position as the first enhancement layer frame if there is no base layer frame at the same temporal position as the first enhancement layer frame, (d) lossy coding texture data of the base layer frame using the motion vector of the base layer frame, (e) coding a difference between the motion vector in the first enhancement layer frame and the generated predicted motion vector, and the obtained motion vector in the base layer, and (f) losslessly coding a difference between the motion vector in the first enhancement layer frame and the generated predicted motion vector, the motion vector in the base layer frame, the lossy coded result of step (d), and the lossy coded result of step (e).

According to still another aspect of the present invention, there is provided a multi-layered video encoding method including (a) obtaining a motion vector in a base layer frame having a first frame rate from an input frame, (b) generating a motion vector by referring to a motion vector for at least one frame among base layer frames present immediately before and after the same temporal position as the first enhancement layer frame if there is no base layer frame at the same temporal position as the first enhancement layer frame, (c) lossy coding texture data of the base layer frame using the motion vector of the base layer frame, (d) lossy coding texture data of the first enhancement layer frame using the motion vector of the first enhancement layer frame, and (e) losslessly coding the motion vector in the base layer frame, the lossy coded result of step (c), and the lossy coded result of step (d).

According to yet another aspect of the present invention, there is provided a multi-layered video decoding method including (a) extracting base layer data and enhancement layer data from an input bitstream, (b) if there is no base layer frame at the same temporal position as a first enhancement layer frame, generating a motion vector of the first enhancement layer frame by referring to the motion vector for at least one frame among base layer frames present immediately before and after the same temporal position as the first enhancement layer frame, (c) reconstructing the motion vector of the enhancement layer using the generated predicted motion vector, and (d) reconstructing a video sequence from texture data of the enhancement layer using the reconstructed motion vector of the enhancement layer.

According to a further aspect of the present invention, there is provided a multi-layered video decoding method including (a) extracting base layer data and enhancement layer data from an input bitstream, (b) if there is no base layer frame at the same temporal position as an enhancement layer frame, reconstructing a motion vector in the enhancement layer frame by referring to at least one frame among base layer frames present immediately before and after the same temporal position as the enhancement layer frame, and (c) reconstructing a video sequence from texture data of the enhancement layer using the reconstructed motion vector of the enhancement layer.

BRIEF DESCRIPTION OF THE DRAWINGS

The above and other features and advantages of the present invention will become more apparent by describing in detail preferred embodiments thereof with reference to the attached drawings in which:

FIG. 10 is a diagram for explaining a method of an exemplary embodiment of the invention of obtaining a filtered motion vector when a resolution of a base layer and a resolution of an enhancement layer are different from each other.

DETAILED DESCRIPTION OF EXEMPLARY EMBODIMENTS OF THE INVENTION

Figure 1:
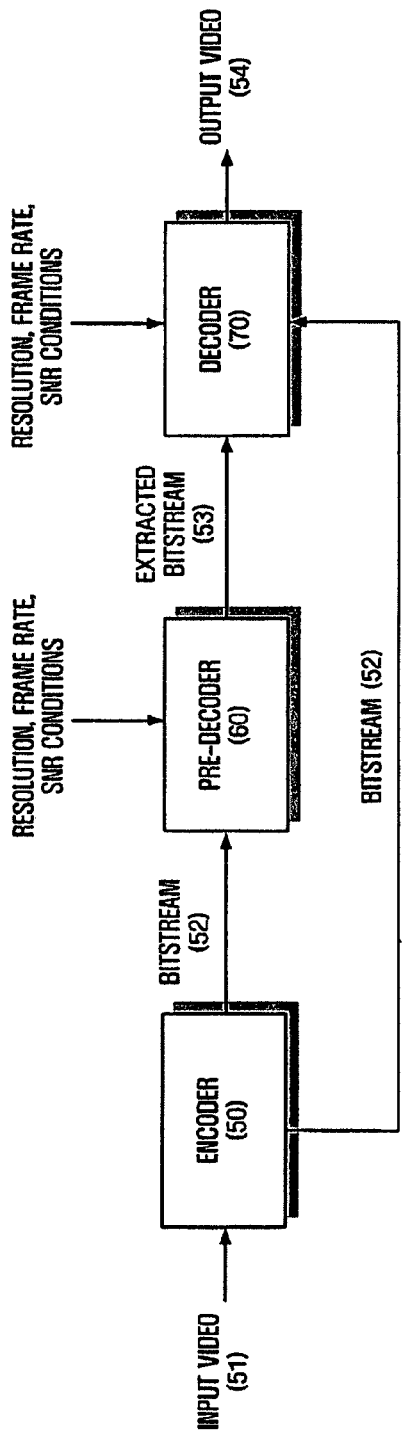
FIG. 1 shows an overall configuration of a general scalable video coding system.
Figure 2:
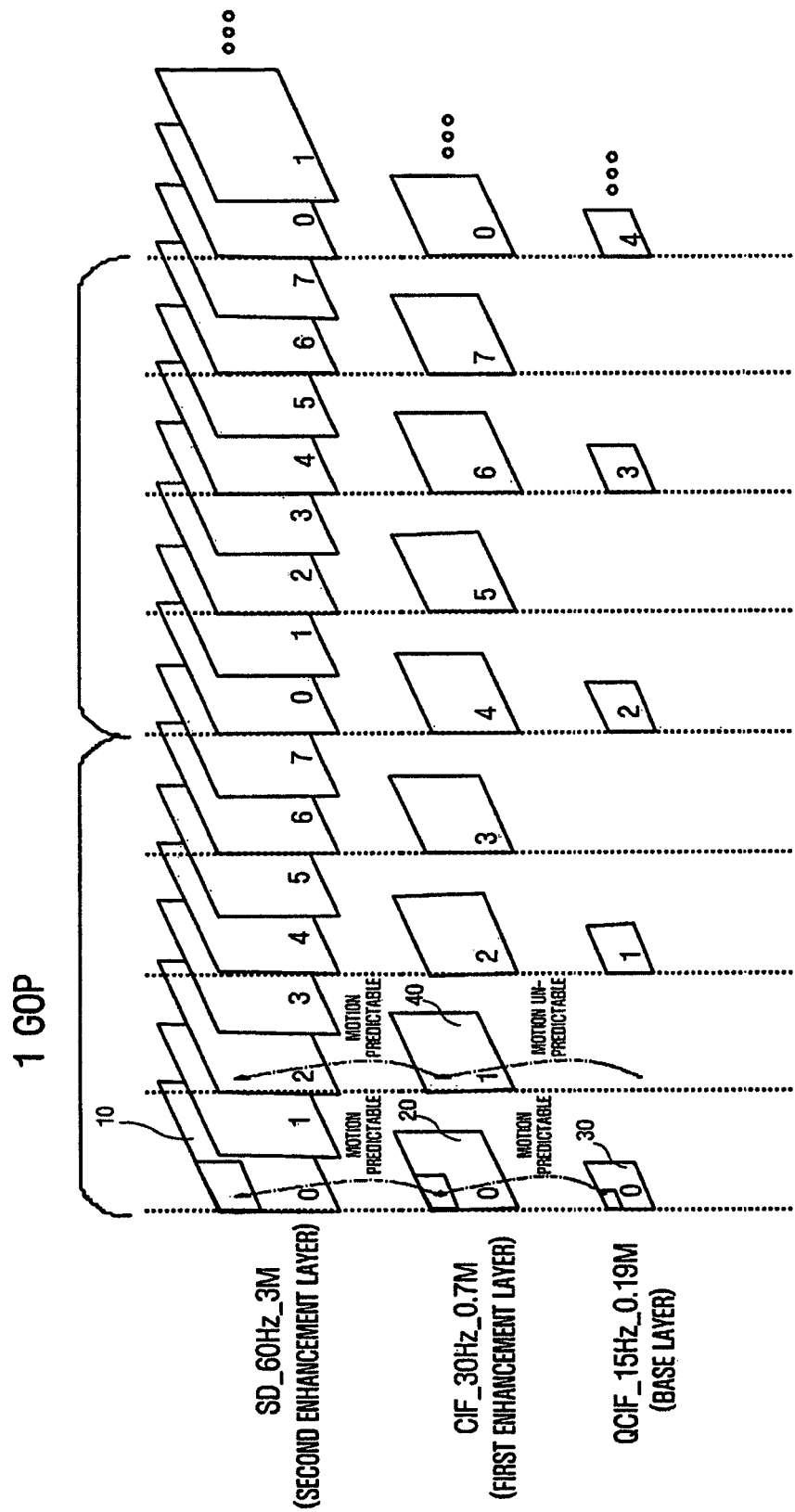
FIG. 2 is a diagram of video coding using a multi-layered structure.
Figure 3:
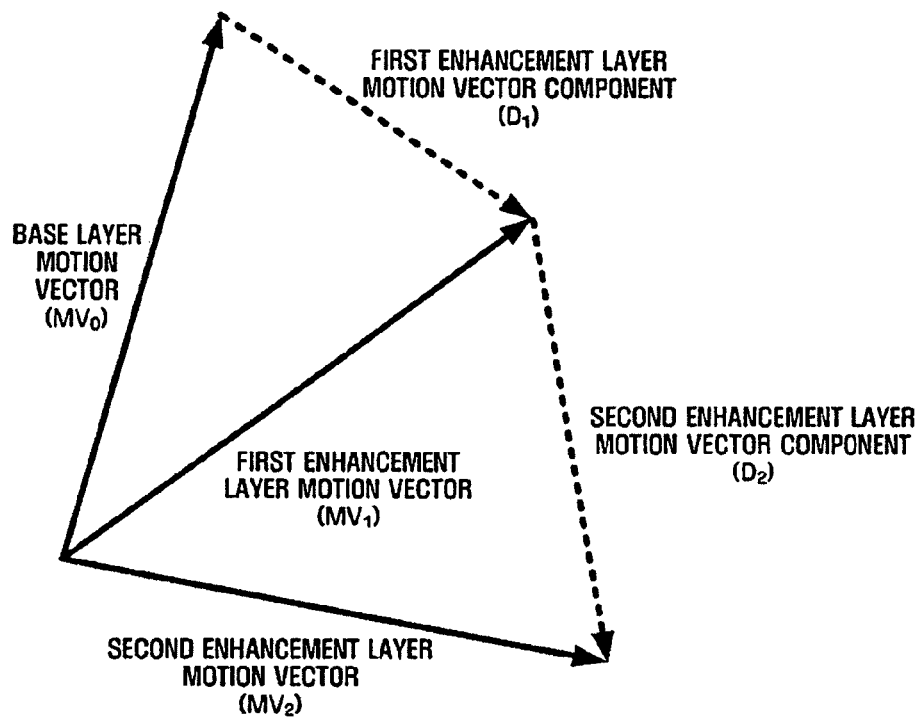
FIG. 3 is a diagram for explaining a conventional method for efficiently representing a motion vector using motion prediction.

The present invention will now be described more fully with reference to the accompanying drawings, in which exemplary embodiments of the invention are shown. Advantages and features of the present invention and methods of accomplishing the same may be understood more readily by reference to the following detailed description of exemplary embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

Figure 4:
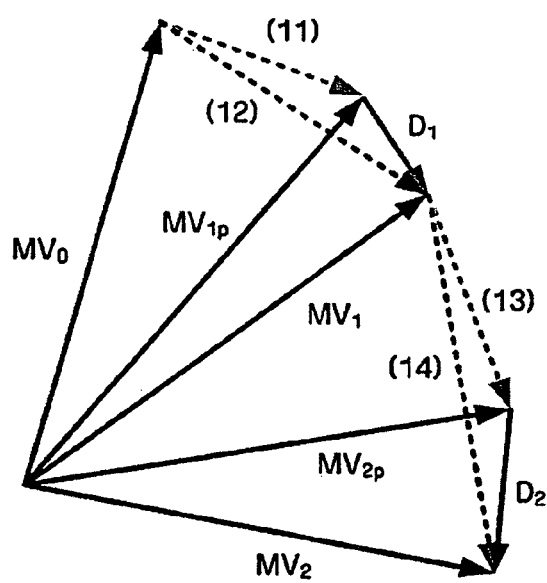
FIG. 4 is a diagram for explaining a method for efficiently representing a motion vector using motion prediction according to an embodiment of the present invention.

The more accurately the motion prediction is performed, the less the overhead due to a motion vector becomes. Unlike in a case where motion vectors in lower layers, i.e., $MV_0$ and $MV_1$, are used as estimation motion vectors $MV_{1p}$ and $MV_{2p}$, in a case where a more accurate motion estimation method is employed, as shown in FIG. 4, the motion vectors $MV_0$ and $MV_1$ demonstrate the same moving effect as vectors 11 and 13. That is, unlike in the conventional art in which a differential value 12 between a motion vector in a current layer and a motion vector in a lower layer of the current layer and a differential value 14 between a motion vector in a second enhancement layer and the motion vector in the current layer are transmitted, in a case where the estimation motion vectors $MV_{1p}$ and $MV_{2p}$ are used for more accurate motion estimation, smaller values $D_1$ and $D_2$ have only to be stored. Accordingly, bit amounts needed for motion vectors can be reduced and bits corresponding to the reduced bit amounts are allocated to textures, thereby enhancing picture quality levels.

To achieve this, first, a process of generating the estimation motion vectors $MV_{1p}$ and $MV_{2p}$ should be performed just by reading motion information of a lower layer without additional information. Second, the motion vectors referenced should be set to be substantially close to motion vectors in the current layer.

Figure 5:
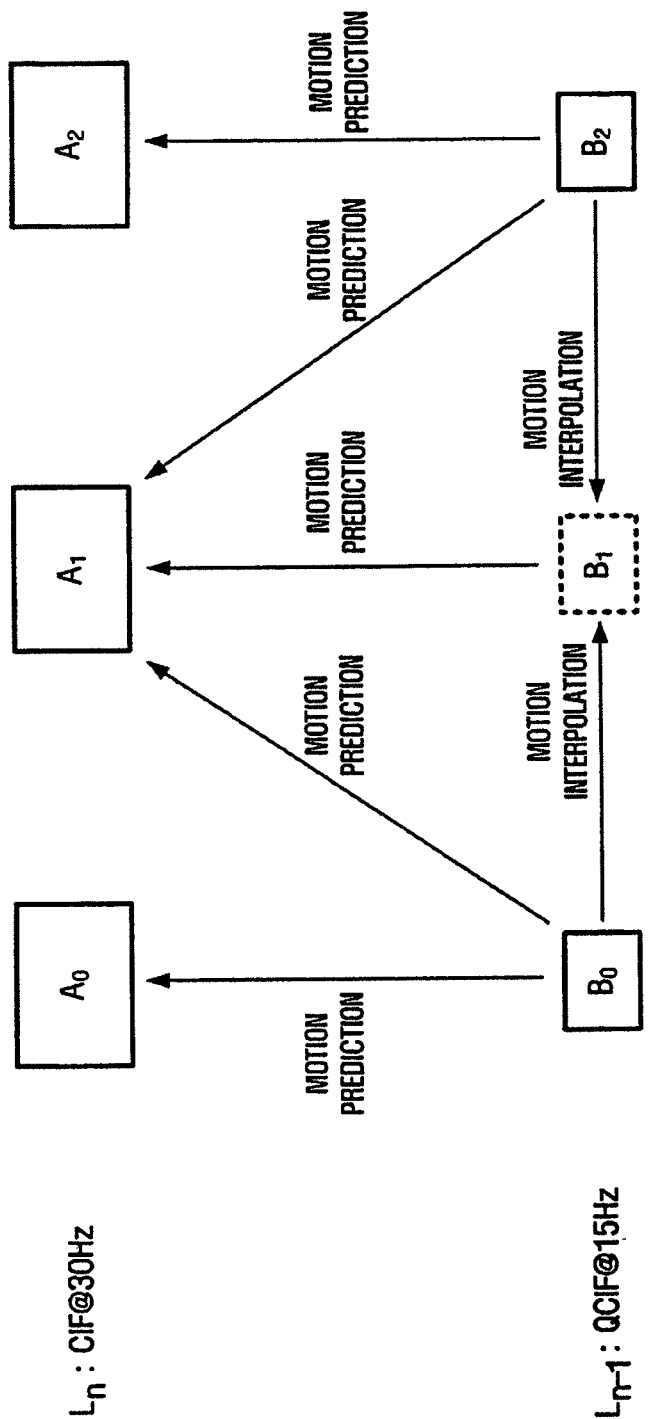
FIG. 5 is a schematic diagram for explaining a concept of the present invention.

FIG. 5 is a schematic diagram for explaining a fundamental concept of the present invention. It is assumed in this example that a current layer $L_n$ has CIF resolution and frame rate of 30 Hz and a lower layer $L_{n-1}$ has QCIF resolution and frame rate of 15 Hz.

In the present invention, if there is a base layer frame at the same temporal position as the current layer frame, a predicted motion vector is generated by referring to a motion vector in the base layer frame. On the other hand, if there is no base layer frame corresponding to the current layer frame, a predicted motion vector is generated using motion vectors in at least one of base layer frames located closest to the temporal position. Referring to FIG. 5, motion vectors in current layer frames $A_0$ and $A_2$ are respectively predicted from motion vectors in lower layer frames $B_0$ and $B_2$ having the same temporal positions as the current layer frames $A_0$ and $A_2$. Here, what is meant by "motion predicted" is substantially predicted motion vector being generated.

On the other hand, a predicted motion vector for a frame $A_1$ having no corresponding lower layer frame at the same temporal position is generated using motion vectors in the frames $B_0$ and $B_2$ closest to the temporal position. To achieve this, motion vectors in the frames $B_0$ and $B_2$ are interposed to generate a virtual motion vector (a motion vector in a virtual frame $B_1$) at the same temporal position as the frame $A_1$ and the virtual motion vector is used to predict a motion vector for the frame $A_1$.

For example, assuming that a frame A1 of the current layer performs bi-directional prediction using the current layer frames $A_0$ and $A_2$ as reference frames, forward and backward motion vectors can perform efficient prediction using lower layer frames $B_0$ and $B_2$, respectively.

If the lower layer frame $B_0$ has a backward motion vector (having $B_2$ as a reference frame), a distance referred of the backward motion vector for the lower layer frame $B_0$ is twice that of a current layer motion vector. Thus, when the distance and direction referred are taken into consideration, the predicted motion vector for the forward motion vector of the frame $A_1$ can be calculated by multiplying the backward motion vector of the frame $B_0$ by $-\frac{1}{2}$. In addition, the predicted motion vector for the backward motion vector of the frame $A_1$ can be calculated by multiplying the backward motion vector of the frame $B_0$ by $\frac{1}{2}$. In order to reduce a computational error, a value obtained by summing the backward motion vector of the frame $B_0$ and the calculated forward motion vector of the frame $A_1$ can also be used as the predicted motion vector for the backward motion vector of the frame $A_1$.

Meanwhile, if the lower layer frame $B_2$ has a forward motion vector (having $B_0$ as a reference frame), a distance referred of the forward motion vector for the lower layer frame $B_2$ is twice that of a current layer motion vector. Thus, when the distance and direction referred are taken into consideration, the predicted motion vector for the forward motion vector of the frame $A_1$ can be calculated by multiplying the forward motion vector of the frame $B_2$ by $\frac{1}{2}$. In addition, the predicted motion vector for the backward motion vector of the frame $A_1$ can be calculated by multiplying the forward motion vector of the frame $B_2$ by $-½$. In order to reduce a computational error, a value obtained by subtracting the forward motion vector of the frame $B_2$ from the calculated forward motion vector of the frame $A_1$ can also be used as the predicted motion vector for the backward motion vector of the frame $A_1$.

Figure 6:
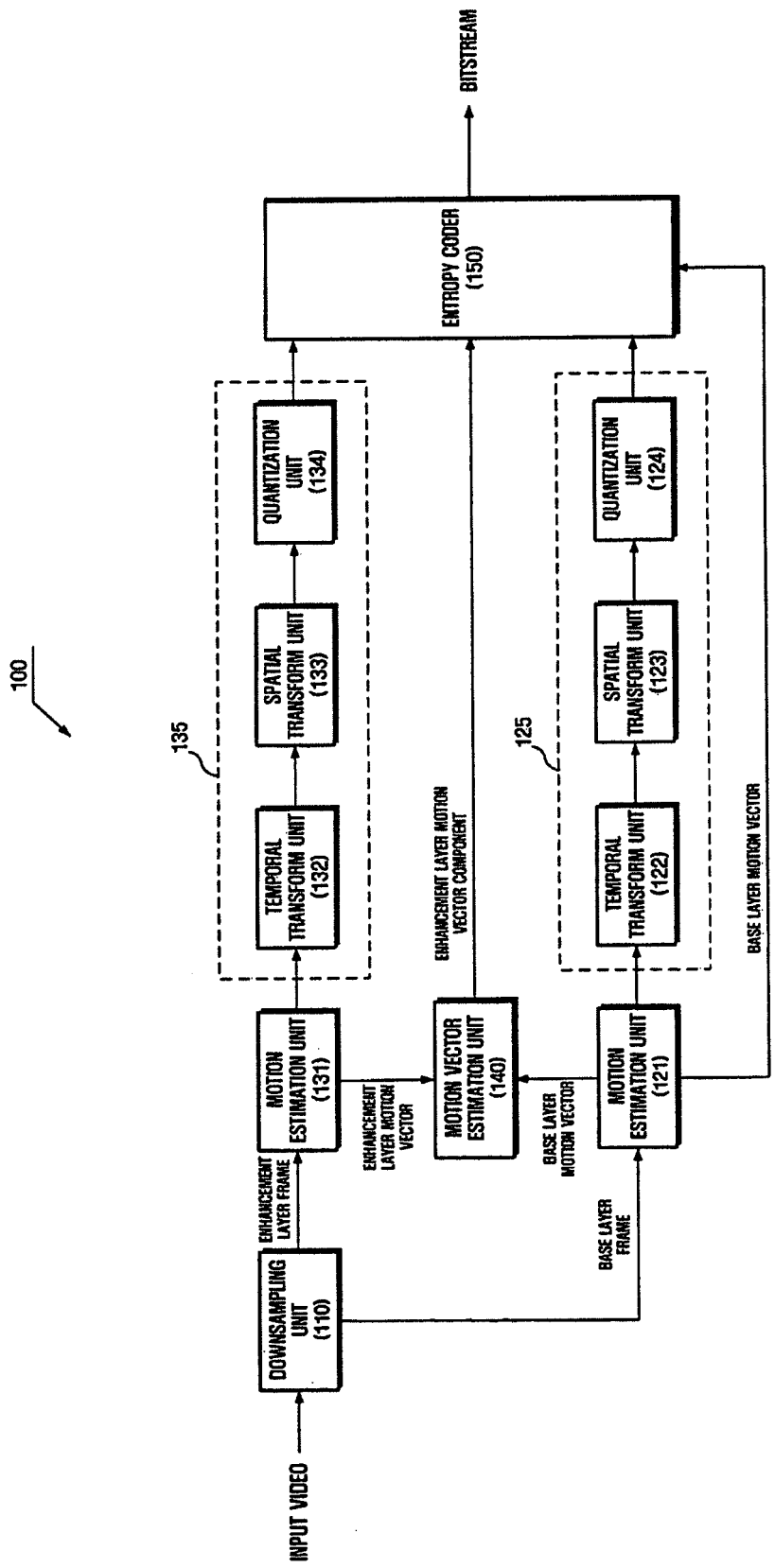
FIG. 6 is a block diagram of a video encoder according to an exemplary embodiment of the present invention.

FIG. 6 is a block diagram of a video encoder 100 according to an embodiment of the present invention. While FIG. 6 shows the use of one base layer and one enhancement layer, it will be readily apparent to those skilled in the art that the present invention can be applied between a lower layer and an upper layer when two or more layers are used.

Referring to FIG. 6, the video encoder 100 includes a downsampling unit 110, motion estimation units 121, 131, lossy encoders 125, 135, a motion vector estimation unit 140, and an entropy coder 150.

The downsampling unit 110 downsamples an input video to a resolution and frame rate suitable for each layer. When a QCIF@15 Hz base layer and a CIF@30 Hz enhancement layer are used as shown in FIG. 5, an original input video is downsampled to CIF and QCIF resolutions and then downsampled to frame rates of 15 Hz and 30 Hz. Downsampling the resolution may be performed using a MPEG downsampling unit or wavelet downsampler. Downsampling the frame rate may be performed using frame skip or frame interpolation.

As described above, it is obvious to one skilled in the art that the enhancement layer does not have both a higher resolution and a higher frame rate than the base layer but has a higher resolution than and the same frame rate as the base layer, or the same resolution with and a higher frame rate than the base layer.

A motion estimation unit 121 performs motion estimation on a base layer frame to obtain motion vectors in the base layer frame. The motion estimation is the process of finding the closest block to a block in a current frame, i.e., a block with a minimum error. Various techniques including fixed-size block matching and hierarchical variable size block matching (HVSBM) may be used in the motion estimation. In the same manner, the motion estimation unit 131 performs motion estimation on an enhancement layer frame to obtain motion vectors in the enhancement layer frame. The motion vectors in the base layer frame and the enhancement layer frame are obtained in this way to predict a motion vector in the enhancement layer frame using a virtual motion vector.

The motion vector prediction unit 140 generates a predicted motion vector in an enhancement layer using the motion vectors in the base layer and obtains a difference between the obtained motion vector and the predicted motion vector in the enhancement layer frame (hereinafter, referred to as "motion vector components").

The operation performed by the motion vector prediction unit 140 will now be described in more detail with reference to FIG. 7. First, it is determined whether there is a base layer frame at the same temporal position as the current frame in the enhancement layer in step S10. If so (YES in step S10), motion vectors in the base layer frame having a spatial relevancy with the current frame are filtered in step S20. As a result, a filtered motion vector corresponding to one motion vector in the current frame is generated. Step S20 will be described below with reference to FIGS. 9 and 10.

In step S30, it is determined whether resolutions of the enhancement layer and the base layer are the same or not. If the same (YES in step S30), the motion vector in the current frame and the motion vector resulting from the filtering are subtracted in step S40. This is because the motion vector resulting from the filtering corresponds to the predicted motion vector in the case of the same resolution. If not the same (NO in step S30), the motion vector resulting from the filtering is upsampled with the resolution of the enhancement layer in step S45. For example, if the resolution of the enhancement layer is double that the base layer, the term "sampling" means magnification of a motion vector generated by the filtering by two times. In this case, the upsampled motion vector is a predicted motion vector. Thus, a difference between the current frame and the upsampled motion vector is obtained in step S50.

Meanwhile, if it is determined in step S10 that there is no base layer frame at the same temporal position as the current frame in the enhancement layer (NO in step S10), the motion vectors in the base layer frame located immediately before and after the temporal position (that is, the closest frames before and after the temporal position) are filtered in steps S55 and S60. For example, in FIG. 5, the frames located immediately before and after the same temporal position as the current frame $A_1$ are $B_0$ and $B_2$. In other words, among the motion vectors in the frame, e.g., $B_0$, present immediately before the temporal position, a motion vector having a spatial correlation with a motion vector in the current frame is filtered to generate a filtered motion vector in step S55. Then, among motion vectors in the frame, e.g., $B_2$, present immediately after the temporal position, a motion vector having a spatial correlation with a motion vector in the current frame is filtered to generate a filtered motion vector in step S60. This filtering process is similar to that in step S20, which will later be described in FIGS. 9 and 10.

Next, the current frame and a "virtual motion vector" at the temporal position are interpolated using the filtered motion vector generated after the filtering in step S55 and the filtered motion vector generated after the filtering in step S60. Usable examples of interpolation include a simple averaging method, bi-linear interpolation, bi-cubic interpolation, and so on. If the distances from the frames present immediately before and after the temporal position are different, unlike in FIG. 5, interpolation is preferably performed such that an interpolation weighted factor is increased so as to be in inverse proportion to a distance. As described above, if the distances are different, only one frame closest from the current frame can be used.

Figure 8:
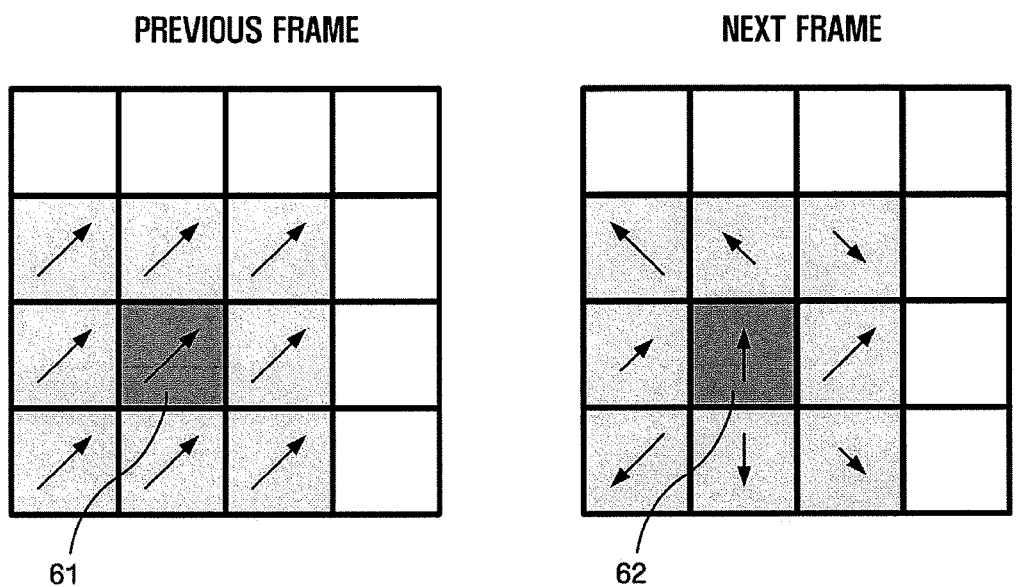
FIG. 8 illustrates examples of motion fields of previous and next frames.

Rather than the above-mentioned simple interpolation methods, in consideration of characteristics of motion vector fields, weighted factors of immediately previous and next frames may be determined. As shown in FIG. 8, motion vectors in the immediately previous and next frames are displayed (white block portions being portions with motion vectors skipped), blocks having the same spatial position as a certain motion vector in the current frame are block 61 and block 62. In the case of the immediately previous frame, motion vectors in those in the vicinity of the block 61 (enlargement or reduction convertible) are substantially the same as the motion vector of the block 61. On the other hand, in the case of the immediately next frame, motion vectors in those in the vicinity of the block 62 are mostly different from the motion vector of the block 62. Thus, in generating predicted motion vectors for motion vectors in the current frame, a weighted factor of the motion vector in the immediately previous frame is preferably increased for more accurate motion estimation. That is to say, a sum of differences between the motion vector of the block 61 and each of the motion vectors in the vicinity of the block 61 is computed, and a sum of differences between the motion vector of the block 62 and each of the motion vectors in the vicinity of the block 62 is computed. The weighted factor of the motion vector in each frame is in inverse proportion to the sum of differences. Since a decoder side receives motion vectors from an encoder side, the weighted factor can be computed in the same manner as in the encoder side without the need of being informed of such from the encoder side.

Next, if the resolution of the enhancement layer and the resolution of the base layer are the same (YES in step S70), the interpolated virtual motion vector is a predicted motion vector. Therefore, in order to effectively compress a motion vector, subtraction is performed on the motion vector in the current frame and the virtual motion vector in step S75. The subtraction result becomes the motion vector component in the enhancement layer.

On the other hand, if the resolution of the enhancement layer and the resolution of the base layer are not the same (NO in step S70), the interpolated virtual motion vector is upsampled to be as large as the motion vector in the enhancement layer in step S80. As described above, since the upsampled motion vector is a predicted motion vector, subtraction is performed on the motion vector in the current frame and the upsampled motion vector in step S85.

Figure 9:
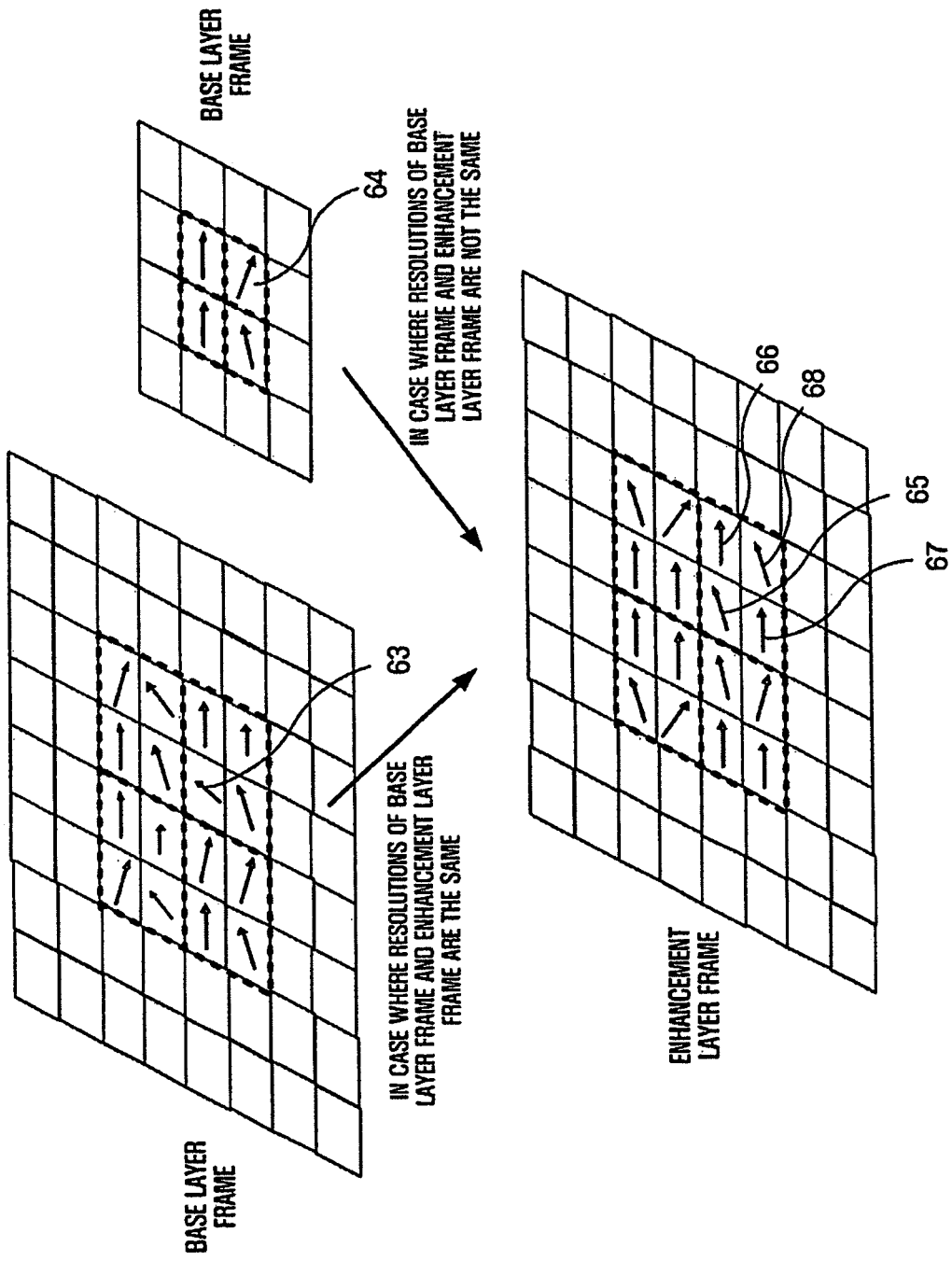
FIG. 9 is a diagram for explaining a filtering process of an exemplary embodiment of the invention.

FIG. 9 is a diagram for explaining a filtering process. Here, "filtering" means a process of obtaining a filtered motion vector using a motion vector for an enhancement layer frame and motion vectors having a spatial correlation with the enhancement layer frame. Here, the position having a "spatial correlation" means a "directly corresponding position" (First Embodiment), or the directly corresponding position and a region including the vicinity enlarged from the position (Second Embodiment).

The first embodiment will first be described. Referring to FIG. 9, if the resolution of the enhancement layer and the resolution of the base layer are the same, a motion vector having a spatial correlation with (that is, positioned directly corresponding to) the motion vector 65 is a motion vector 63. In this case, the motion vector 63 is a "filtered motion vector."

If the resolution of the enhancement layer and the resolution of the base layer are not the same, a motion vector having a spatial correlation with (that is, positioned directly corresponding to) the motion vector 65 is a motion vector 64. In this case, the motion vector 64 is a "filtered Motion vector." Of course, the motion vector 64 has a spatial correlation with motion vectors 66, 67, and 68 as well as the motion vector 65.

Next, the second embodiment will be described, in which filtering is performed in consideration of not only motion vectors positioned directly corresponding to a certain motion vector but also motion vectors in the vicinity thereof. In this case, the term "a position having a spatial correlation" used herein is meant to embrace a directly corresponding position and a region including the vicinity thereof. The reason for enlarging the region in such a manner is that motion vectors have a spatial similarity and taking adjacent motion vectors into consideration may be advantageous for motion prediction.

If the resolution of the enhancement layer and the resolution of the base layer are the same, as shown in FIG. 9, while the motion vector 63 directly corresponds to the motion vector 65, filtering is performed in consideration of not only the motion vector 63 but also the motion vectors in the vicinity of the motion vector 63. For example, assuming that the "vicinity" of the motion vector 63 means 8 motion vectors around the motion vector 63, a filtered motion vector can be obtained by a linear combination of 9 motion vectors, including the motion vector 63. In this case, a relatively greater coefficient (that is, a greater weighted factor) is applied for the motion vector 63 and a relatively smaller coefficient is applied to the adjacent motion vectors. It is obvious that different weighted factors may be applied to the adjacent motion vectors according to positions of sides or edges. In order to obtain a filtered motion vector using a plurality of motion vectors, a median filter, a bi-cubic filter, a quadratic filter, or other filters may be used.

Meanwhile, if the resolution of the enhancement layer and the resolution of the base layer are not the same, while the motion vector 64 directly corresponds to the motion vector 65, filtering is performed in consideration of not only the motion vector 64 but also the motion vectors in the vicinity of the motion vector 64. A process of obtaining a filtered motion vector will be described with reference to FIG. 10 in a case where the resolution of the enhancement layer and the resolution of the base layer are not the same.

First, it is assumed that a block in a base layer corresponds to 4 fixed blocks in a first enhancement layer. For example, a block f corresponds to a region consisting of blocks f5, f6, f7, and f8. To apply a predetermined interpolation method to obtain a reference motion vector, it is necessary to determine a regional range having a spatial correlation in the base layer and then determine weighted factors for motions vectors within the regional range.

For example, a motion vector of block f5 has a high spatial correlation with blocks b, e, and f. Since the block f5 occupies a quarter of a region corresponding to a block f, it is predictable that the block f5 is considerably spatially correlated with block b, block e, and block f in the base layer.

As described above, after the regional range having a spatial correlation is determined, motion vectors present in the region are filtered. In this case, it is preferred that the weighted factor for the block f is greater than that for the block b or block e. In addition, a variety of filters such as a median filter, a bi-cubic filter, or a quadratic filter can be used. Usable examples of interpolation include a simple averaging method, bi-linear interpolation, bi-cubic interpolation, and so on.

Alternatively, not only the block b, block e, and block f but also the block a may be included in the range of the reference block. In addition, different weighted factors may be assigned to the respective blocks, for example, 25% to block b, 25% to block e, 10% to block a, or 40% to block f. Still alternatively, the region of the reference block may be set to include not only the immediately adjacent block but also alternate blocks. One skilled in the art will recognize that the present invention may be implemented in a manner different from that specifically discussed in the present application. If the resolution of the base layer is different from the resolution of the enhancement layer, the scale of a filtered motion vector is different from a motion vector scale of the enhancement layer. This is because the filtered motion vector performs only a filtering using the motion vectors in the base layer. In the present invention, upsampling is performed in a separate manner.

While fixed blocks have been used in the second embodiment of the present invention, appropriately filtering according to the extent of a spatial correlation can be sufficiently implemented using variable blocks.

Referring back to FIG. 6, the lossy coder 125 losslessly codes a base layer frame using the motion vector obtained from the motion estimation unit 121. The lossy coder 125 may include a temporal transform unit 122, a spatial transform unit 123, and a quantization unit 124.

The temporal transform unit 122 constructs predictive frames and performs a subtraction on the current frame and the predictive frame using the motion vector obtained from the motion estimation unit 121 and a frame that is being positioned temporally different from the current frame, thereby reducing a temporal redundancy. As result, a residual frame is generated. Of course, if the current frame is encoded without referencing another frame, that is, if the current frame is an intra frame, it requires no motion vector, and temporal transformation processes using a predictive frame are skipped. Among the temporal transformation processes, to support temporal scalability, MCTF (Motion Compensated Temporal Filtering), or UMCTF (Unconstrained MCTF) may be used.

The spatial transform unit 123 performs a spatial transform on residual frames generated by the temporal transform unit 122 or original input frames and generates transform coefficients. For spatial transform, DCT (Discrete Cosine Transform), wavelet transform, or the like, may be used. In the case of employing the DCT, the transform coefficient is a DCT coefficient, and in the case of employing the wavelet transform, the transform coefficient is a wavelet coefficient.

The quantization unit 124 quantizes the transform coefficient generated by the spatial transform unit 123. Quantization means a process of dividing the DCT coefficients represented by arbitrary real numbered values into predetermined intervals to represent the same as discrete values and matching the discrete values with indices from a predetermined quantization table.

On the other hand, a lossy coder 135 performs lossy coding on the enhancement layer frame using motion vectors in the enhancement layer frame obtained by the motion estimation unit 131. The lossy coder 135 includes a temporal transform unit 132, a spatial transform unit 133, and a quantization unit 134. Because the lossy coder 135 performs the same operation as the lossy coder 125, except that it performs lossy coding on the enhancement layer frame, a detailed explanation thereof will not be given.

The entropy coder 150 losslessly encodes (or entropy encodes) the quantization coefficients obtained by the quantization units 124 and 134 for the base layer and the enhancement layer, the base layer motion vectors generated by the motion estimation unit 121 for the base layer, and the enhancement layer motion vector components generated by the motion vector estimation unit 140 into an output bitstream. Various coding schemes such as Huffman Coding, Arithmetic Coding, and Variable Length Coding may be employed for lossless coding.

While FIG. 6 shows the lossy decoder 125 for the base layer is separated from the lossy decoder 135 for the enhancement layer, it will be obvious to those skilled in the art that a single lossy decoder can be used to process both the base layer and the enhancement layer.

Figure 11:
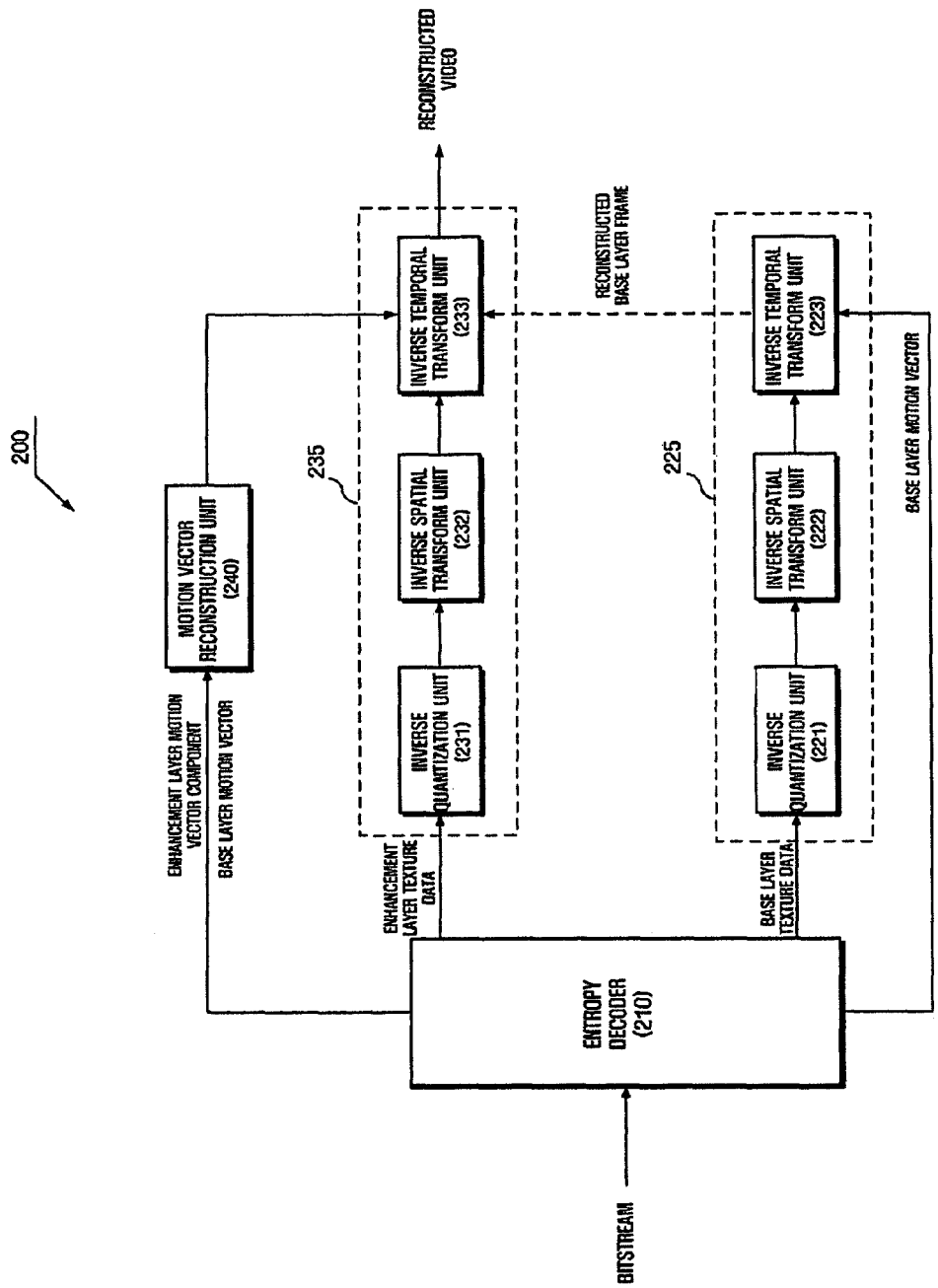
FIG. 11 is a block diagram of a video decoder according to an embodiment of the present invention.

FIG. 11 is a block diagram of a video decoder 200 according to an embodiment of the present invention.

Referring to FIG. 11, the video decoder 200 includes entropy decoder 210, lossy decoders 225, 235, and a motion vector reconstruction unit 240.

The entropy decoder 210 performs the inverse operation of the entropy encoding and extracts motion vectors in a base layer frame, motion vector components of an enhancement layer frame, and texture data from the base layer frame and the enhancement layer frame from an input bitstream.

A motion vector reconstruction unit 240 reconstructs motion vectors in the enhancement layer using the motion vectors in the base layer and motion vector components in the enhancement layer, which will now be described in more detail. The motion vector reconstruction process includes, if there is a base layer frame at the same temporal position as the first enhancement layer frame, generating a predicted motion vector by referring to the motion vector in the base layer frame, if not, generating a predicted motion vector by referring to a motion vector in at least one frame among base layer frames present immediately before and after the temporal position, and reconstructing a motion vector in the enhancement layer by adding the generated predicted motion vector and a motion vector component of the enhancement layer.

Figure 7:
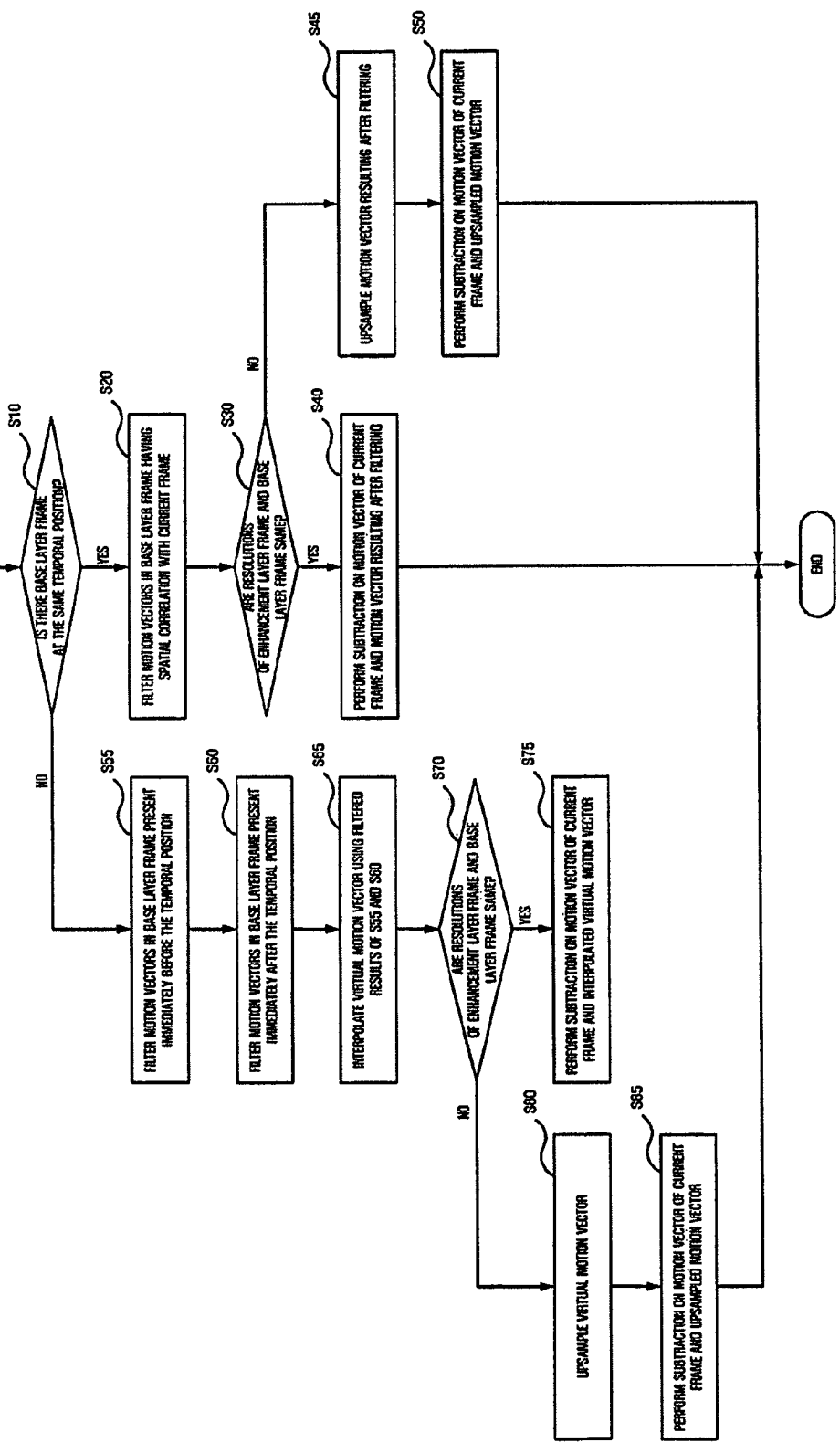
FIG. 7 is a flow diagram for explaining the detailed operation of a motion vector estimation unit of an exemplary embodiment of the invention.

The motion vector reconstruction process is substantially the same as the motion vector estimation process (see FIG. 7), except that the decoder 200 performs an addition step for the predicted motion vector and the motion vector component of the current frame (enhancement layer frame), unlike the encoder 100, as shown in FIG. 7, performing steps S40, S50, S75, and S85 are all subtraction steps for the predicted motion vectors and the motion vectors in the current frame. However, a method of generating a predicted motion vector is the same and a repetitive explanation thereof will not be given.

A lossy decoder 235 performs the inverse operation of the lossy coder (135 of FIG. 6) to reconstruct a video sequence from the texture data of the enhancement layer frames using the reconstructed motion vectors in the enhancement layer frames. The lossy decoder 235 includes an inverse quantization unit 231, an inverse spatial transform unit 232, and an inverse temporal transform unit 233.

The inverse quantization unit 231 performs inverse quantization on the extracted texture data from the enhancement layer frames. The inverse quantization is the process of reconstructing values from corresponding quantization indices created during a quantization process using a quantization table used during the quantization process.

The inverse spatial transform unit 232 performs inverse spatial transform on the inversely quantized result. The inverse spatial transform is the inverse of spatial transform performed by the spatial transform unit 133 in the encoder 100. Inverse DCT and inverse wavelet transform are among techniques that may be used for the inverse spatial transform.

The inverse temporal transform unit 233 performs the inverse operation to the temporal transform unit 132 on the inversely spatially transformed result to reconstruct a video sequence. More specifically, the inverse temporal transform unit 233 uses motion vectors reconstructed by the motion vector reconstruction unit 240 to generate a predicted frame and adds the predicted frame to the inversely spatially transformed result in order to reconstruct a video sequence. Of course, an intra-frame that is not temporally transformed at an encoder is not necessarily subjected to an inverse temporal transform.

The encoder 100 may remove redundancies in the texture of an enhancement layer using a base layer during encoding. In this case, because the decoder 200 reconstructs a base layer frame and uses the reconstructed base layer frame and the texture data in the enhancement layer frame received from the entropy decoder 210 to reconstruct the enhancement layer frame, a lossy decoder 225 for the base layer is used.

In this case, the inverse temporal transform unit 233 uses the reconstructed motion vectors in enhancement layer frames to reconstruct a video sequence from the texture data in the enhancement layer frames (inversely spatially transformed result) and the reconstructed base layer frames.

While FIG. 11 shows the lossy decoder 225 for the base layer is separated from the lossy decoder 235 for the enhancement layer, it will be obvious to those skilled in the art that a single lossy decoder can be used to process both the base layer and the enhancement layer.

Based on a motion vector obtained in each layer, a more effective motion vector compression and transmission method has been described. In another embodiment, after obtaining a motion vector from one among multiple layers, and up-/down-sampling the same, if necessary, the up-/down-sampled motion vector may be used as a motion vector in another layer. In this case, motion vectors can be saved, motion vector accuracy in the enhancement layer may deteriorate.

In this case, a video encoding process includes obtaining a motion vector in a base layer frame having a first frame rate from an input frame, obtaining a motion vector in an enhancement layer frame having a second frame rate greater than the first frame rate, lossy coding texture data of the base layer frame using the motion vector in the base layer frame, lossy coding texture data of the first enhancement layer frame using the motion vector in the first enhancement layer frame, and losslessly coding motion vector in the base layer frame and the lossy coded result.

Here, the obtaining of a motion vector in the enhancement layer frame includes (1) generating a motion vector in the enhancement layer frame by referring to the motion vector in the base layer frame if there is a base layer frame at the same temporal position as the enhancement layer frame, and (2) if not, generating a motion vector in the enhancement layer frame by referring to a motion vector in at least one frame among base layer frames present immediately before and after the temporal position.

The step (1) includes filtering motion vectors in the base layer frame having a spatial correlation with a motion vector in the enhancement layer frame using a predetermined filter, and upsampling the motion vector resulting from the filtering such that the motion vector becomes the same as that of the enhancement layer, if the resolution of the base layer frame is not the same as the resolution of the enhancement layer. The resultant motion vector is used as a motion vector in the enhancement layer not as a predicted motion vector.

The step (2) includes interpolating a virtual motion vector in the base layer frame by referring to the motion vector in the base layer frame present immediately before and after the temporal position if there is a base layer frame at the same temporal position as the enhancement layer frame, and if the resolution of the base layer frame is not the same as the resolution of the enhancement layer, upsampling the interpolated virtual motion vector such that it is as large as the motion vector in the enhancement layer. The resultant motion vector is used as the motion vector in the enhancement layer not as the predicted motion vector.

The filtering process, the upsampling process, and the interpolation process are the same as described above, and a detailed explanation thereof will not be given.

A video decoding method according to an embodiment of the present invention, in which after obtaining a motion vector from one among multiple layers as described above, and up-/down-sampling the same, the up-/down-sampled motion vector is used as a motion vector in another layer, will now be described.

The video decoding process includes extracting a motion vector in a base layer frame and texture data of an enhancement layer frame from an input frame, reconstructing the motion vector in the enhancement layer frame using the extracted motion vector in the base layer frame, and reconstructing a video sequence from the texture data of the base layer frame and the texture data of the first enhancement layer frame.

The reconstructing of the motion vector in the enhancement layer including reconstructing a motion vector in the enhancement layer by referring to the base layer frame if there is a base layer frame at the same temporal position as the enhancement layer frame, and if not, reconstructing a motion vector in the enhancement layer frame by referring to a motion vector in at least one frame among base layer frames present immediately before and after the temporal position.

As described above, the reconstruction process of the motion vector in the enhancement layer frame using only the motion vector in the base layer is substantially the same as the motion vector encoding process for generating the motion vector in the enhancement layer frame the using the motion vector in the base layer.

While the above-mentioned embodiments have been described in case of one base layer and one enhancement layer by way of example, it is obvious to one skilled in the art that the present invention can be easily implemented for multi-layers. If the multi-layers are composed of a base layer, a first enhancement layer, and a second enhancement layer, an algorithm used for the base layer and the first enhancement layer can also apply to the first enhancement layer and the second enhancement layer.

Each of the respective components as shown in FIGS. 6 and 11, may be, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more computers in a communication system.

According to the present invention, the compression efficiency of multi-layered motion vectors can be improved.

In addition, the quality of an image segmented into layers with the same bit-rates can be enhanced.

While the present invention has been particularly shown and described with reference to exemplary embodiments thereof, it will be understood by those of ordinary skill in the art that various changes in form and details may be made therein without departing from the spirit and scope of the present invention as defined by the following claims. Therefore, it is to be understood that the above-described embodiments have been provided only in a descriptive sense and will not be construed as placing any limitation on the scope of the invention.

What is claimed is:

1. A multi-layered video decoding method comprising:
   (a) extracting, by a video decoder, base layer data and enhancement layer data from an input bitstream;
   (b) when there is no base layer frame at a same temporal position as a first enhancement layer frame, generating, by the video decoder, a motion vector of the first enhancement layer frame by referring to the motion vector for at least one frame among base layer frames present immediately before and after the same temporal position as the first enhancement layer frame;
   (c) reconstructing, by the video decoder, the motion vector of the enhancement layer using the generated predicted motion vector; and
   (d) reconstructing, by the video decoder, a video sequence from texture data of the enhancement layer using the reconstructed motion vector of the enhancement layer.

2. The method of claim 1, wherein operation (b) comprises:
(b1) if there is a base layer frame at the same temporal position as the enhancement layer frame, generating a predicted motion vector by referring to the motion vector of the base layer frame.

3. The method of claim 2, wherein operation (b1) comprises:
(b11) filtering motion vectors in the base layer frame having a spatial correlation with a motion vector in the enhancement layer frame using a predetermined filter; and
(b12) if the resolution of the base layer frame is not the same as the resolution of the first enhancement layer, generating the predicted motion vector by upsampling the motion vector generated resulting from the filtering to be as large as the motion vector in the enhancement layer.

4. The method of claim 1, wherein the filtering is performed with different weighted factors assigned to the respective motion vectors according to the spatial correlation.

5. The method of claim 1, wherein operation (b) comprises:
(b21) interpolating the virtual motion vector of the base layer frame by referring to motion vectors in base layer frames present immediately before and after the same temporal position as the first enhancement layer frame; and
(b22) if the resolution of the base layer frame is not the same as the resolution of the first enhancement layer, generating the predicted motion vector by upsampling the interpolated virtual motion vector to be as large as the motion vector of the enhancement layer.

* * * * *